United States Patent [19]
Herrick et al.

[11] Patent Number: 5,625,364
[45] Date of Patent: Apr. 29, 1997

[54] APPARATUS AND METHOD FOR FINDING A SIGNAL EMISSION SOURCE

[75] Inventors: David L. Herrick, Mont Vernon; William F. Matthews, III, Hudson, both of N.H.

[73] Assignee: Lockheed Sanders, Inc., Nashua, N.H.

[21] Appl. No.: 272,724

[22] Filed: Jul. 8, 1994

[51] Int. Cl.$^6$ .............................. G01S 5/04; G01S 13/00
[52] U.S. Cl. ........................ 342/449; 342/194; 342/442; 342/419
[58] Field of Search .................................. 342/449, 194, 342/442, 152, 428

[56] References Cited

U.S. PATENT DOCUMENTS

| | | | |
|---|---|---|---|
| 3,845,487 | 10/1974 | Lammers | 342/418 |
| 4,106,023 | 8/1978 | Baghdady | 342/405 |
| 5,099,248 | 3/1992 | Brommer | 342/430 |

Primary Examiner—Gregory C. Issing
Attorney, Agent, or Firm—David W. Gomes

[57] ABSTRACT

An apparatus and method are described for direction finding the source of emf emissions including a monotone signal by detecting the phase changes of the monotone signal during movement relative to the source. A software embodiment measures the amount of phase change.

20 Claims, 3 Drawing Sheets

1

APPARATUS AND METHOD FOR FINDING A SIGNAL EMISSION SOURCE

BACKGROUND OF THE INVENTION

1. Field of the Invention

The present invention generally relates to the location finding of emf radiation emitters and particularly to methods and apparatus for such which measure signal phase variation during relative movement.

2. Statement of the Prior Art

The proliferation of cellular telephone, or cell phone, technology and usage has revealed various applications for the ability to locate cell phones. These applications include "911" calls and the tracking of unauthorized cell phone usage and illegal activities in which cell phones are used. One of the problems which limits success in this area is multipath reflections of cell phone signals. This problem is acute in urban environments where there is greater fraudulent use of cell phone accounts and especially for illegal activities. The multipath problem is further compounded when a cell phone is being used within a large building and there is a need to locate and/or apprehend the user.

A large amount of technology exists for locating the source of radio emissions using direction finding techniques. These techniques are very effective in open environments where there are few if any multipath reflections. Unfortunately, multipath reflections interfere with the original electromagnetic wavefront and create a resulting wavefront which changes direction in an unpredictable manner. In such cases, direction finding equipment which detects the normal direction to a wavefront is easily confused. Likewise, signal strength and doppler measurements are ambiguous.

SUMMARY OF THE INVENTION

Accordingly, it is an object of the present invention to provide a method and apparatus for locating the source of radio transmissions within a multipath signal environment.

It is a further object of the present invention to provide such a method and apparatus which is effective to locate cellular telephone transmissions.

It is a still further object of the present invention to provide such a method and apparatus which is effective in high multipath environments.

In one form, the present invention provides a method for sensing the direction of a source of emf emissions including a monotone signal, comprising the steps of: receiving the monotone signal with an omnidirectional antenna; moving the antenna relative to the source of emissions and in a known direction while the emissions including the monotone signal are being received; detecting an amount of phase change of the received monotone signal due to the moving of the antenna; and generating an output signal indicative of the amount of phase change detected as an indication of the relationship between the known direction of movement and the direction of the source of emissions.

In another form the present invention provides an apparatus for sensing the direction of a source of emf emissions including a monotone signal, comprising: means for receiving the monotone signal including an omnidirectional antenna being adapted to allow movement of the antenna relative to the source of emissions and in a known direction while the emissions including the monotone signal are being received; means for detecting an amount of phase change for the received monotone signal due to movement of the antenna relative to the source of emissions; and means for generating an output signal indicative of the amount of phase change detected as an indication of a relationship between the known direction of movement and the direction of the source of emissions.

In yet another form, the present invention provides a computer program for calculating an amount of phase change of a received emf emission including a monotone signal, comprising: first instruction means for measuring frequency of the detected monotone signal; second instruction means for generating a reference signal in response to the measured frequency; third instruction means for modulating the received monotone signal with the reference signal and a quadrature version of the reference signal to produce I and Q components of the monotone signal; fourth instruction means for producing sequential, corresponding pairs of I and Q component values from the I and Q components; fifth instruction means for multiplying each pair of I and Q component values by the Q and I component values, respectively, of a subsequent I and Q component value pair to produce sequential pairs of corresponding cross products; and sixth instruction means for determining sign and magnitude differences between each pair of cross products as the amount of phase change of the monotone signal.

BRIEF DESCRIPTION OF THE DRAWINGS

The present invention is illustratively described and shown in reference to the appended drawings in which.

DETAILED DESCRIPTION OF THE DRAWINGS

Figure 1:
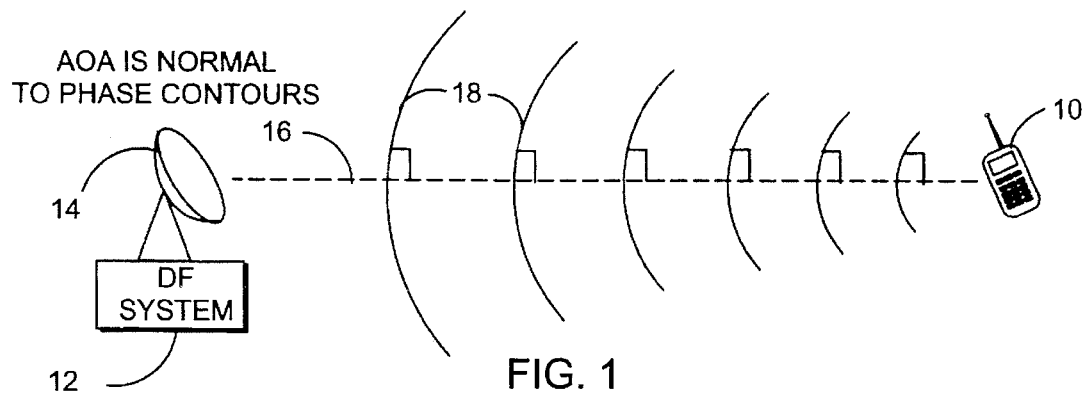
FIG. 1 is a representational diagram showing the direction finding of a cell phone transmission in accordance with the prior art and in the absence of multipath interference.

FIG. 1 shows ordinary direction finding techniques used to determine the direction of arrival of transmissions from a cell phone 10 at a receiver 12. Receiver 12 includes a directional antenna 14 and detection means for determining the direction 16 which is normal to the propagation of transmission waves 18.

Figure 2:
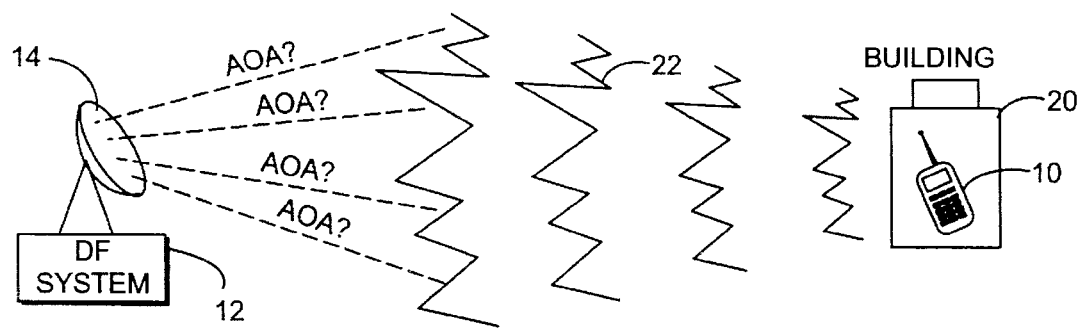
FIG. 2 is a representational diagram showing the problem of direction finding a cell phone transmission using the prior art of FIG. 1 in a high multipath environment such as a building.

FIG. 2 shows the problem of direction finding of the same cell phone 10 with the same receiver 12 in a multipath environment such as that created in an urban area or within a building 20. Problems occur because the transmission signal reflects from various objects, such as steel superstructures, and is attenuated by various building materials. The reflected waves interfere with the direct transmission waves and create a wavefront 22 which is unique to the reflective environment and the transmission frequency. The reflective environment will also vary with the direction of propagation along which the direction finding is being attempted. When the distorted multipath wavefronts reach the directional antenna 14, the direction of propagation and the normal thereof are ambiguous and cannot be detected by an ordinary receiver. It is known, however, that using a sufficiently large antenna, that is one which is many times the wavelength of interest, will cause the ambiguous wavefronts to average out and provide some accuracy to a direction of arrival determination. However, such an antenna is impractical for use in urban environments and within buildings.

Figure 3:
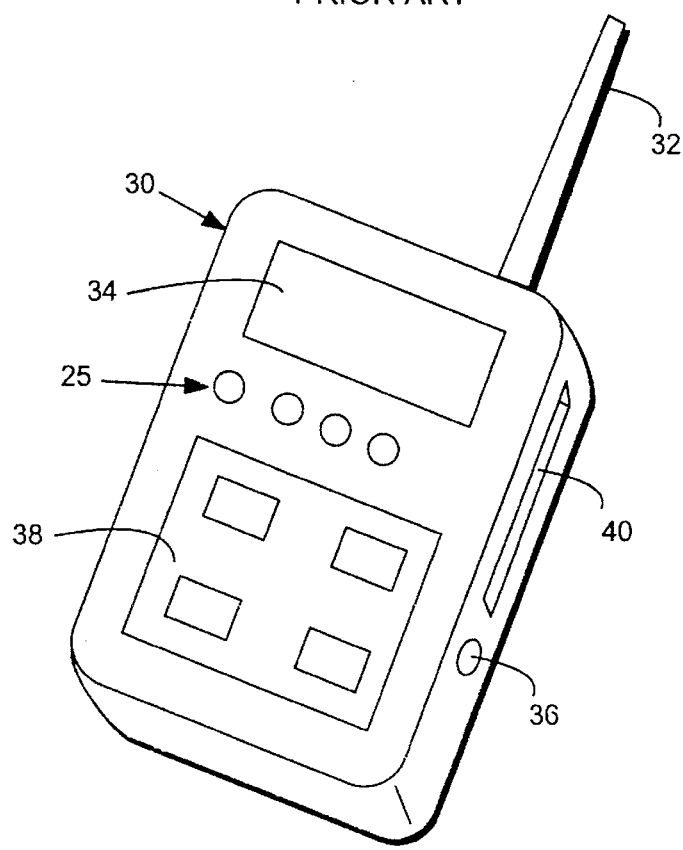
FIG. 3 is a representational perspective view of a hand held device constructed in accordance with one embodiment of the present invention.

FIG. 3 shows an embodiment of the present invention in which a hand held sensor unit 30 is approximately the size of a cellular telephone. Contrary to the known systems for direction finding, the present invention uses a nondirectional, or omnidirectional antenna 32 having the same length as that of a common transmitter/receiver antenna, in this case a cell phone. The hand held sensor unit 30 includes one or more indicator means such as an LCD 34, indicator LEDs 35, and an earphone jack 36 for outputting an audio signal for the purpose of communicating signal direction to an operator. Unit 30 also includes control means 38 for powering the unit 30, selecting the carrier frequency to be monitored and controlling the characteristics of the output signal produced. Additionally, an output port 40 may be included, such as a PCMCIA slot, to allow coupling of the received signal to another device for further analysis or for retention as evidentiary proof.

Figure 4:
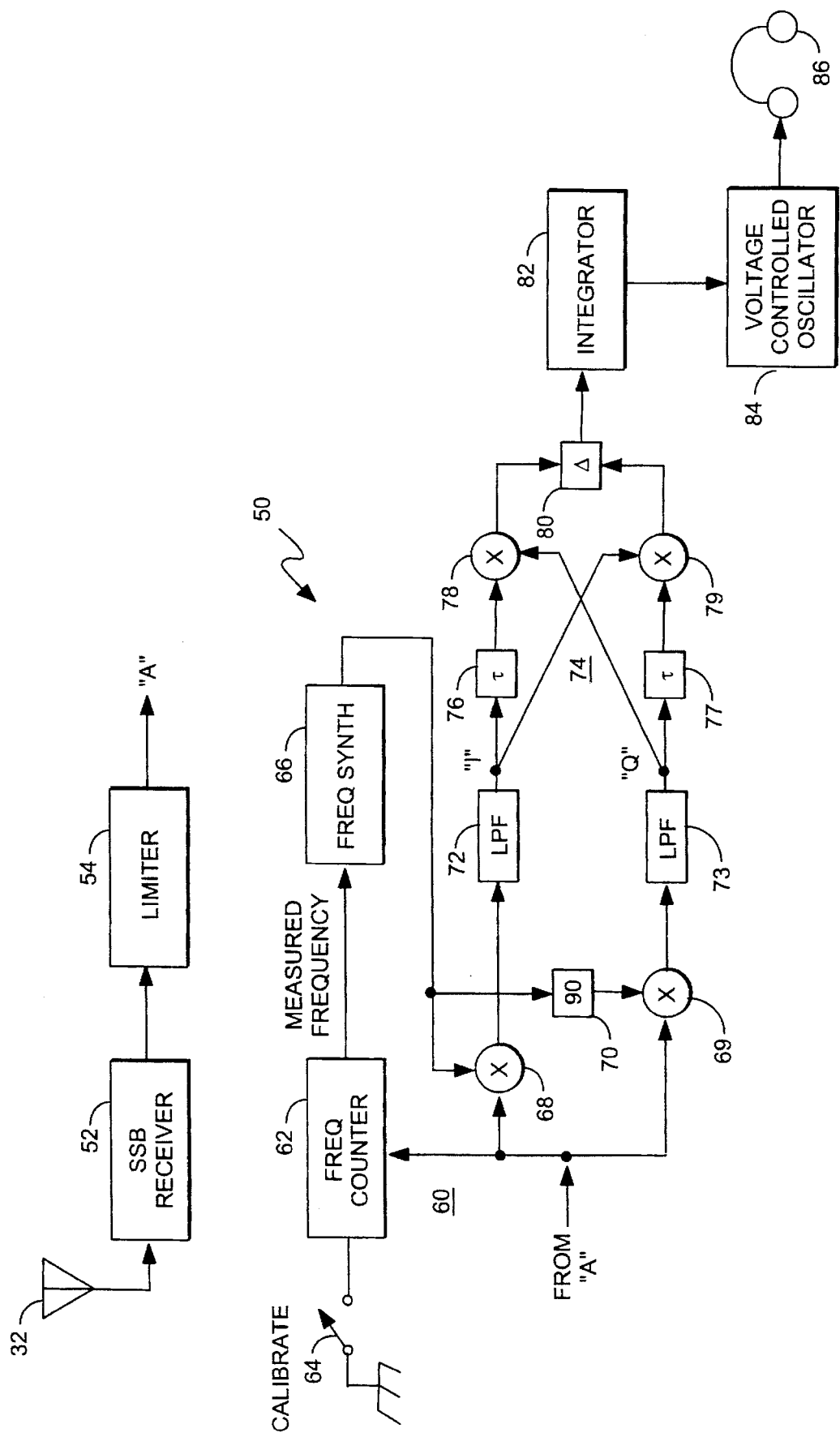
FIG. 4 is a circuit block diagram of an apparatus constructed in accordance with one embodiment of the present invention.

FIG. 4 shows a block diagram of a signal sensor 50 constructed in accordance with one embodiment of the present invention. As the present invention is applicable to a wide variety of transmitters, including cellular telephones, any reference herein to a cell phone may be read, when applicable, to refer to other transmitters and vice versa.

In operation, signals from the omnidirectional antenna 32 are coupled to a receiver 52 which is tunable and which demodulates the transmitter carrier signal, or any other monotone signal present in the transmission, down to base band and removes any modulation information. Thus, the demodulated output signal produced by receiver 52 is a monotone, of nominally 300 Hz, the phase and frequency of which will vary in direct correspondence to the phase and frequency of the received signal to which the receiver 52 is tuned. The signal produced is referred to as a monotone even though the frequency may drift over time.

Receiver 52 may be implemented by any suitable means. In the case of a cell phone, a portion of receiver 52 may be a standard cell phone chip set which is capable of following voice channel assignments. Such assignments are made on the forward control channel when a call is first placed and are subsequently made on the forward voice channel. Voice channel reassignments may be made even when the cell phone is stationary.

The receiver output signal is coupled to a limiter 54 which only needs to monitor the sign of the signal to determine when the signal crosses zero volts. This information is sufficient to monitor the phase and frequency of that signal. Limiter 54 may be implemented by an A/D converter which only measures sign. The output of an A/D converter would simply be a sign bit at the specific sampling frequency, which sign bit would change with the signal phase and frequency. The output of limiter 54 is at most a square wave which follows the frequency and phase of the receiver output signal.

The remainder of the circuit may be implemented either directly in hardware or else in a microprocessor by means of software.

The square wave or sign data is then fed to phase monitoring section 60 where it is first received at the clock input of a frequency counter 62. When a calibrate button 64 is pressed, frequency counter 62 is activated for a predetermined time period, such as ten or twelve seconds, to count the cycles of the demodulated signal. The calibration button is pressed while the sensor 50 is stationary so that the signal received is the steady state phase and frequency of the monotone signal. This allows counter 62 to measure any variations of the monotone signal frequency, including frequency drift, which are due to the individual transmitter.

Once the frequency is counted for the predetermined time period, the count is fed to a frequency synthesizer 66 which creates a reference frequency for monitoring the phase of the cell phone. Frequency synthesizer 66 continues to run at the measured carrier signal frequency, and its output is fed to a first modulator 68 and to a second modulator 69 through a quadrature phase shifter 70.

The other inputs of modulators 68,69 both receive the same carrier frequency square wave or the sign data generated in limiter 54. The outputs of modulators 68,69 are fed through low pass filters 72,73 to provide I and Q components of the received monotone signal.

The I and Q components are then fed to a cross multiplier section 74 which measures the phase change, positive and negative, of the demodulated carrier frequency, with respect to the reference frequency over a predetermined period of time, tau. Cross multiplier section 74 includes a pair of delays 76,77 a pair of multipliers 78,79 and a subtractor 80. Delays 76,77 have a predetermined delay time, tau. Multipliers 78,79 are connected to produce the cross products of the I and Q components of signal samples separated by the delay tau. For example, the real component magnitude of a delayed first sample is multiplied by the imaginary component magnitude of a subsequent second sample and the imaginary component magnitude of the delayed first sample is multiplied by the real component magnitude of the subsequent second sample. These cross products should not be confused with vector cross products.

The cross products from multipliers 78,79 are connected to the inputs of subtractor 80. In this manner, cross multiplier section 74 measures the amount of angular phase change of the carrier frequency with respect to the reference frequency over the period tau.

Tau is selected to be short enough, less than one radian of the expected phase change, so that the phase change angle theta is substantially approximated by sine theta. Because the monitored signal is modulated by a substantially identical reference frequency signal from synthesizer 66, such measured phase changes should only occur when the sensor 50 is moving with respect to the transmitter or cell phone. This makes the rate of change for the phase fairly small and allows a nominal delay period, tau.

Subtractor 80 outputs a signal which is proportional to the change of phase of the received carrier signal with respect to the reference signal and with a positive or negative sign depending upon the direction of the phase change.

The output of subtractor 80 is coupled to an integrator 82, the accumulated voltage from which controls an oscillator 84. As the sensor 50 approaches the transmitting cell phone, positive phase changes are sensed in the monitored signal causing the output voltage of integrator 82 to increase and the resulting tone from oscillator 84 to rise in pitch. Sensor movement away from the transmitter similarly causes a drop in pitch. With the tone being outputed to a pair of headphones 86, an operator can move around an area or building and know whether the movement is towards or away from the transmitting cell phone.

Figure 5:
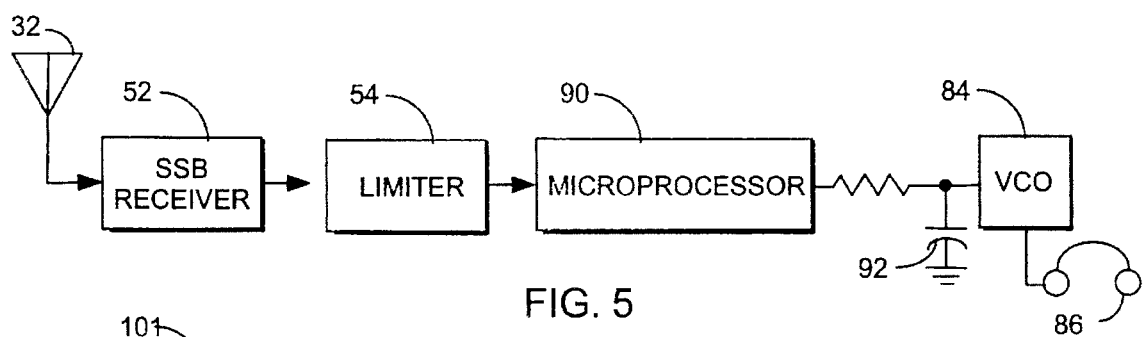
FIG. 5 is an alternate embodiment of the circuit of FIG. 4.
Figure 6:
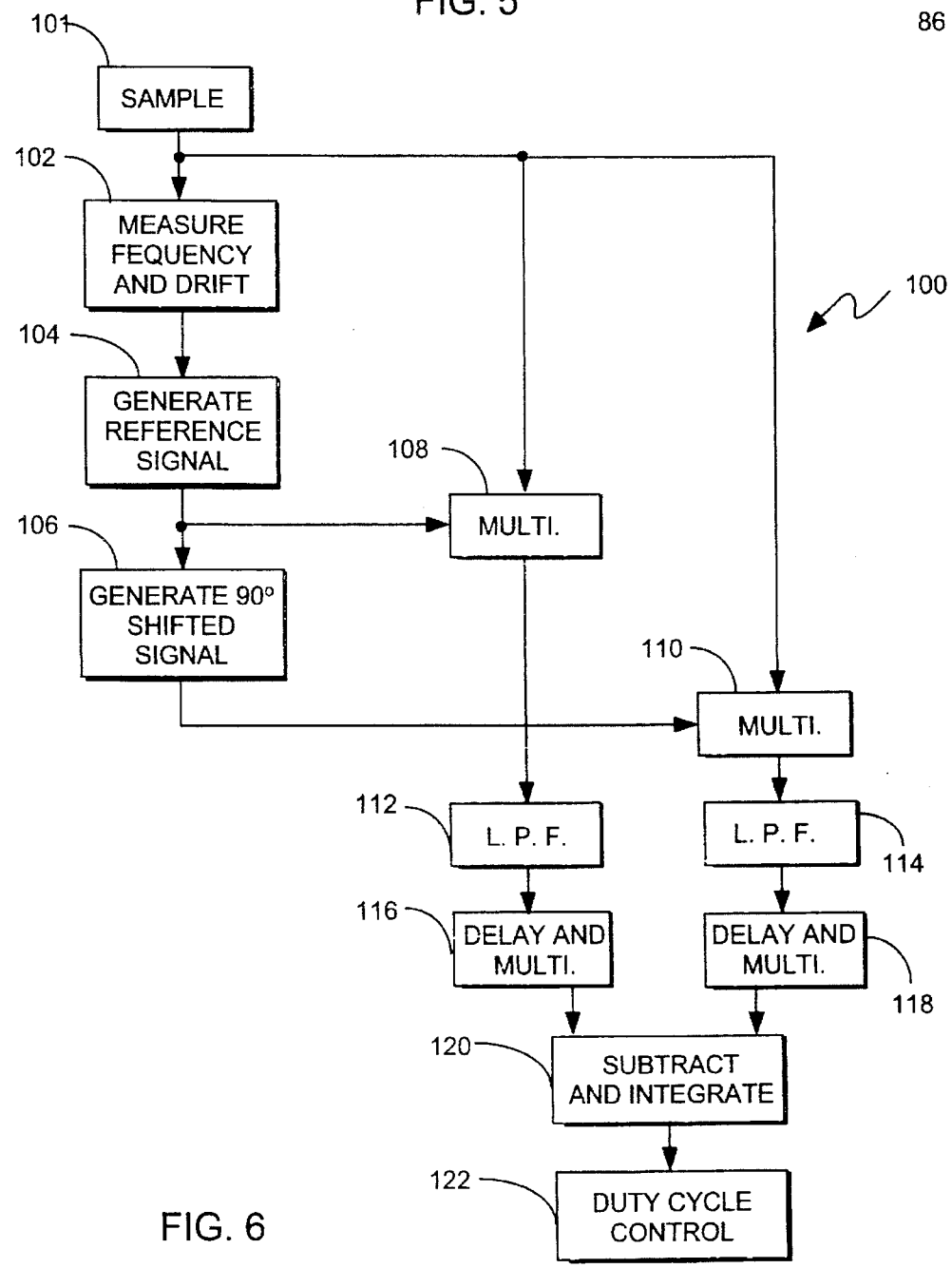
FIG. 6 is a flow chart of a software embodiment of a portion of the circuit of FIG. 4.

As previously mentioned, everything from the output of limiter 54 may be implemented in a microprocessor 90 as shown in FIG. 5. The software implementation 100 is shown as a flow chart in FIG. 6.

The signal from limiter 54 is input to microprocessor 90 via a TTL input where it is sampled at 1.2 KHz, or every 0.825 ms. in software step 101. This technique samples only the sign or phase of the input signal and the sampled value is recorded simply as a logical one or zero.

The software first uses the sampled data to measure the frequency and drift of the monotone signal in step 102 by examining the samples taken to determine phase changes of the input signal and count the number of full cycles received over a predetermined calibration period. More specifically, the phase is measured by recording the sample time measurements whenever a zero crossing is detected. These crossing times contain information concerning frequency drift of the monitored signal. A linear regression analysis is performed on the zero crossing times to calculate a rate of frequency drift for the monitored signal. The total cycles measured divided by the predetermined calibration period provides an average frequency value. After the predetermined calibration period, sampling of the input signal is continued and used to measure phase variation as described below.

The measured frequency and drift are used by software step 104 to generate a first series of logical ones and zeros at the same sample frequency of the input sampling and representing a pseudo square wave signal having the same rate of phase change or frequency and drift as the received signal being sampled. A corresponding second series of ones and zeros is also generated at the same sample rate and pseudo signal frequency in step 106, but having a phase which is shifted 90 degrees from the first pseudo signal.

The sampled signal from step 101 is then separately multiplied in steps 108,110 by each of the first and second pseudo signals from steps 104,106 by multiplying the corresponding time samples of the respective signals. This multiplication generates rough I and Q components of the sampled input signal, which components are represented as real numbers instead of single, logical ones and zeros.

These I and Q components are then "cleaned up" with low pass filtering. The filtering is performed in software steps 112,114 by calculating a weighted average of each component value with the weighted average of the sequentially previous component value. Low pass filtering of less than 10 Hz or so is accomplished by adding approximately three percent (3%) of the new component value to ninety-seven percent (97%) of the previous weighted average. The newly calculated weighted average is saved as the filtered I or Q component value and is also used in calculation with the next sequential component value to determine the next sequential average or filtered component value. Separate calculations are performed for the I and Q components.

The software steps 116,118 next cross multiply the I and Q components with delayed component values in the same manner as the cross multiplier 74 in FIG. 4. The delay period tau is simply the sample period of 0.825 ms so that the software steps 116,118 simply cross multiply sequential I and Q components. Wherein first and second sequential time samples may be represented as a+jb and c+jd, respectively, the a and b values from filter steps 112,114, respectively, are delayed until the similar production of the c and d values to produce the desired cross multiplication of ac and bd.

The multiplication results are next subtracted in step 120 resulting in a value representing the amount of phase change during the sampling period of the transmitter signal sampled in step 101 with respect to the reference signal generated in step 104. Step 120 accumulates this value as a means of integration.

Software step 122 then uses this accumulated value to determine the duty cycle of a square wave which is outputed on a single pin of processor 90. This square wave is then used to charge a capacitor 92 and thereby control the same voltage controlled oscillator 84 of FIG. 4.

The embodiments described above are intended to be taken in an illustrative and not a limiting sense. Various modifications and changes may be made to the above embodiments by persons skilled in the art without departing from the scope of the present invention as defined in the appended claims.

What is claimed is:

1. A method for sensing the direction of a source of emf emissions including a monotone signal, comprising the steps of:

receiving the monotone signal with an omnidirectional antenna;

moving the antenna relative to the source of emissions and in a known direction while the emissions including the monotone signal are being received;

detecting the amount of phase change of the received monotone signal due to the moving of the antenna; and generating an output signal indicative of the amount of phase change detected as an indication of the relationship between the known direction of movement and the direction of the source of emissions.

2. The method of claim 1, wherein the step of detecting includes the steps of:

measuring the frequency of the received monotone signal;

generating a reference signal in response to the measured frequency; and detecting the amount of phase change by referencing the received monotone signal to the generated reference signal.

3. The method of claim 2, wherein the step of measuring the frequency includes the steps of:

monitoring phase changes of the received monotone signal over a predetermined period;

calculating an average frequency over the predetermined period; and calculating an average rate of frequency drift over the predetermined period.

4. The method of claim 3, wherein the step of generating a reference signal is responsive to the calculated average frequency and the calculated average rate of frequency drift.

5. The method of claim 2, wherein the step of detecting the amount of phase change further includes the steps of:

modulating the received monotone signal with the reference signal and a quadrature version of the reference signal to produce I and Q components of the monotone signal;

producing sequential, corresponding pairs of I and Q component values from the I and Q components;

multiplying each pair of I and Q component values by the Q and I component values, respectively, of a subsequent I and Q component value pair to produce sequential pairs of corresponding cross products;

determining sign and magnitude differences between each pair of cross products; and accumulating or integrating the determined sign and magnitude differences as the amount of phase change of the received monotone signal due to the moving of the antenna.

6. The method of claim 5, further comprising the step of demodulating the received monotone signal to base band and removing any modulation therefrom.

7. The method of claim 6, wherein the step of demodulating includes converting the monotone signal to a square wave signal having a phase which matches that of the monotone signal.

8. The method of claim 2, wherein the step of measuring is performed during minimal movement of the antenna relative to the source of emissions.

9. The method of claim 1, wherein the steps of detecting and generating are performed by a programmed computer processor.

10. An apparatus for sensing the direction of a source of emf emissions including a monotone signal, comprising:

means for receiving the monotone signal including an omnidirectional antenna being adapted to allow movement of the antenna relative to the source of emissions and in a known direction while the emissions including the monotone signal are being received;

means for detecting an amount of phase change for the received monotone signal due to movement of the antenna relative to the source of emissions; and means for generating an output signal indicative of the amount of phase change detected as an indication of a relationship between the known direction of movement and the direction of the source of emissions.

11. The apparatus of claim 10, wherein the means for detecting includes:

means for measuring frequency of the received monotone signal; and means for generating a reference signal in response to the measured frequency.

12. The apparatus of claim 11, wherein the means for measuring frequency includes:

means for monitoring phase changes of the received monotone signal over a predetermined period;

means for calculating an average frequency over the predetermined period; and means for calculating an average rate of frequency drift over the predetermined period.

13. The apparatus of claim 12, wherein the means for generating a reference signal is responsive to the calculated average frequency and the calculated average rate of frequency drift.

14. The apparatus of claim 11, wherein the means for detecting an amount of phase change further includes:

means for modulating the received monotone signal with the reference signal and a quadrature version of the reference signal to produce I and Q components of the monotone signal;

means for producing sequential, corresponding pairs of I and Q component values from the I and Q components;

means for multiplying each pair of I and Q component values by Q and I component values, respectively, of a subsequent I and Q component value pair to produce sequential pairs of corresponding cross products;

means for determining the sign and magnitude differences between each pair of cross products; and means for accumulating or integrating the determined sign and magnitude differences as the amount of phase change of the received monotone signal due to movement of the antenna relative to the source of emissions.

15. The apparatus of claim 14, wherein means for receiving includes means for demodulating the received monotone signal to base band and for removing any modulation therefrom.

16. The apparatus of claim 15, wherein the means for demodulating includes means for converting the monotone signal to a square wave signal having a phase which matches that of the received monotone signal.

17. A method for calculating an amount of phase change of a received emf emission including a monotone signal, comprising the steps of:

measuring frequency of the monotone signal;

generating a reference signal in response to the measured frequency;

modulating the received monotone signal with the reference signal and a quadrature version of the reference signal to produce I and Q components of the monotone signal;

producing sequential, corresponding pairs of I and Q component values from the I and Q components;

multiplying each pair of I and Q component values by the Q and I component values, respectively, of a subsequent I and Q component value pair to produce sequential pairs of corresponding cross products; and determining sign and magnitude differences between each pair of cross products as the amount of phase change of the monotone signal.

18. The method of claim 17, wherein the step of measuring frequency includes:

monitoring phase changes of the received monotone signal over a predetermined period;

calculating an average frequency over the predetermined period, in response to the monitored phase changes; and calculating an average rate of frequency drift over the predetermined period, in response to the monitored phase changes.

19. The method of claim 18, wherein the step of generating a reference signal is responsive to the calculated average frequency and the calculated average rate of frequency drift.

20. The method of claim 19, further comprising the step of accumulating or integrating the determined sign and magnitude differences.

* * * * *